(12) United States Patent
Hayashi (10) Patent No.: US 11,605,831 B2
(45) Date of Patent: Mar. 14, 2023

(54) NON-AQUEOUS ELECTROLYTE SECONDARY BATTERY INCLUDING A HEAT RESISTANCE LAYER

(71) Applicant: TOYOTA JIDOSHA KABUSHIKI KAISHA, Toyota (JP)

(72) Inventor: Kunihiko Hayashi, Anjo (JP)

(73) Assignee: TOYOTA JIDOSHA KABUSHIKT KAISHA, Toyota (JP)

(*) Notice: Subject to any disclaimer, the term of this patent is extended or adjusted under 35 U.S.C. 154(b) by 338 days.

(21) Appl. No.: 16/897,544

(22) Filed: Jun. 10, 2020

(65) Prior Publication Data
US 2020/0395629 A1 Dec. 17, 2020

(30) Foreign Application Priority Data
Jun. 11, 2019 (JP) .............................. JP2019-108717

(51) Int. Cl.
*H01M 10/0525* (2010.01)
*H01M 10/0566* (2010.01)
(Continued)

(52) U.S. Cl.
CPC ......... *H01M 10/0525* (2013.01); *H01M 4/62* (2013.01); *H01M 10/0566* (2013.01);
(Continued)

(58) Field of Classification Search
CPC ............. H01M 10/0525; H01M 4/62; H01M 10/0566; H01M 10/0585; H01M 10/0587; H01M 2004/021; H01M 10/4235; H01M 2004/028; H01M 4/13; H01M 4/131; Y02E 60/10; Y02P 70/50
(Continued)

(56) References Cited

U.S. PATENT DOCUMENTS

2015/0333308 A1* 11/2015 Toyoda ............... H01M 50/403
429/144

FOREIGN PATENT DOCUMENTS

JP 2017-143004 A 8/2017

* cited by examiner

*Primary Examiner* — Gary D Harris
(74) *Attorney, Agent, or Firm* — Sughrue Mion, PLLC (57) ABSTRACT

Provided is a non-aqueous electrolyte secondary battery that can be produced while mixing at an interface between a positive electrode active material layer and a heat resistant layer is restricted even if a positive electrode slurry and a heat resistant layer slurry are simultaneously applied. The non-aqueous electrolyte secondary battery disclosed here includes a positive electrode, a negative electrode, and a non-aqueous electrolyte. The positive electrode includes a positive electrode current collector, a positive electrode active material layer formed on the positive electrode current collector, and a heat resistant layer which is formed on the positive electrode current collector and is adjacent to the positive electrode active material layer. The positive electrode active material layer contains a positive electrode active material. The positive electrode active material is porous particles in which primary particles are aggregated. The positive electrode active material has a dibutyl phthalate oil absorption of 26.5 mL/100 g or more and 45.0 mL/100 g or less. The heat resistant layer contains an inorganic filler. A ratio of a tap density of the positive electrode active material to a tap density of the inorganic filler is 1.32 or more and 2.44 or less.

2 Claims, 4 Drawing Sheets

(51) Int. Cl.
*H01M 10/0587* (2010.01)
*H01M 4/62* (2006.01)
*H01M 10/0585* (2010.01)
*H01M 4/02* (2006.01)

(52) U.S. Cl.
CPC ... *H01M 10/0585* (2013.01); *H01M 10/0587* (2013.01); *H01M 2004/021* (2013.01)

(58) Field of Classification Search
USPC .......................................................... 429/218
See application file for complete search history.

NON-AQUEOUS ELECTROLYTE SECONDARY BATTERY INCLUDING A HEAT RESISTANCE LAYER

BACKGROUND OF THE INVENTION

1. Field of the Invention

The present disclosure relates to a non-aqueous electrolyte secondary battery. This application claims the benefit of foreign priority to Japanese Patent Application No. 2019-108717, filed Jun. 11, 2019, which is herein incorporated by reference in its entirety.

2. Description of the Related Art

In recent years, non-aqueous electrolyte secondary batteries such as lithium ion secondary batteries have been suitably used for portable power supplies for computers and mobile terminals and power supplies for driving vehicles such as electric vehicles (EV), hybrid vehicles (HV), and plug-in hybrid vehicles (PHV).

A positive electrode of a non-aqueous electrolyte secondary battery generally has a configuration in which a positive electrode active material layer is provided on a positive electrode current collector. A technology in which, in order to restrict short circuiting between a positive electrode and a negative electrode, a heat resistant layer is provided on a part of a positive electrode current collector adjacent to a positive electrode active material layer is known (for example, refer to Japanese Patent Application Publication No. 2017-143004). Such a positive electrode is produced as follows: generally, a slurry containing components constituting a positive electrode active material layer (hereinafter also referred to as a "positive electrode slurry") is applied to a positive electrode current collector and dried to form a positive electrode active material layer, and a slurry containing components constituting a heat resistant layer (hereinafter also referred to as a "heat resistant layer slurry") is then applied so as to be adjacent to a positive electrode active material layer, and dried.

SUMMARY OF THE INVENTION

However, when the heat resistant layer is formed after the positive electrode active material layer is formed as described above, as shown in the drawings in Japanese Patent Application Publication No. 2017-143004, a tapered part having a thickness gradually decreasing is formed at the end of the positive electrode active material layer due to surface tension of the positive electrode slurry. Since the tapered part does not contribute to charging and discharging of the non-aqueous electrolyte battery, the capacity of the battery becomes lower as the tapered part becomes more elongated.

Therefore, the inventors have attempted to simultaneously apply a positive electrode slurry and a heat resistant layer slurry in order to minimize formation of the tapered part. As a result, the applied positive electrode slurry and the applied heat resistant layer slurry are brought adjacent to each other, and thus an inclination angle of the tapered part of the positive electrode active material layer increases, and it is possible to prevent the tapered part from becoming elongated. However, a phenomenon in which these are mixed at an interface between the positive electrode active material layer and the heat resistant layer is observed. In addition, new problems in which, when a positive electrode in which such mixing occurs is used, the positive electrode active material layer expands and contracts according to charging and discharging of the non-aqueous electrolyte secondary battery, and the heat resistant layer peels off due to stress caused by the expansion and contraction have been newly found.

Here, an object of the present disclosure is to provide a non-aqueous electrolyte secondary battery that can be produced while mixing at an interface between a positive electrode active material layer and a heat resistant layer is restricted even if a positive electrode slurry and a heat resistant layer slurry are simultaneously applied.

The non-aqueous electrolyte secondary battery disclosed here includes a positive electrode, a negative electrode, and a non-aqueous electrolyte. The positive electrode includes a positive electrode current collector, a positive electrode active material layer formed on the positive electrode current collector, and a heat resistant layer which is formed on the positive electrode current collector and is adjacent to the positive electrode active material layer. The positive electrode active material layer contains a positive electrode active material. The positive electrode active material is porous particles in which primary particles are aggregated. A dibutyl phthalate oil absorption of the positive electrode active material is 26.5 mL/100 g or more and 45.0 mL/100 g or less. The heat resistant layer contains an inorganic filler. A ratio of a tap density of the positive electrode active material to a tap density of the inorganic filler is 1.32 or more and 2.44 or less.

In such a configuration, there is provided a non-aqueous electrolyte secondary battery that can be produced while mixing at an interface between a positive electrode active material layer and a heat resistant layer is restricted even if a positive electrode slurry and a heat resistant layer slurry are simultaneously applied.

In a desirable aspect of the non-aqueous electrolyte secondary battery disclosed here, the positive electrode active material has a dibutyl phthalate oil absorption of 31.8 mL/100 g or more and 45.0 mL/100 g or less.

In such a configuration, the non-aqueous electrolyte secondary battery can be produced with a high yield because a positive electrode slurry having an appropriate viscosity and favorable coatability is easily prepared.

DESCRIPTION OF THE PREFERRED EMBODIMENTS

Hereinafter, embodiments of the present disclosure will be described. Here, components other than those particularly mentioned in this specification that are necessary for implementation of the present disclosure (for example, general configurations and production processes of a non-aqueous electrolyte secondary battery that do not characterize the present disclosure) can be recognized by those skilled in the art as design matters based on the related art in the field. The present disclosure can be implemented based on content disclosed in this specification and common technical knowledge in the field.

Here, "secondary battery" in this specification refers to a power storage device in general that can be repeatedly charged and discharged and is a term including a so-called storage battery and a storage element such as an electric double layer capacitor.

In addition, "lithium ion secondary battery" in this specification refers to a secondary battery which uses lithium ions as charge carriers and realizes charging and discharging according to movement of charges involved in lithium ions between positive and negative electrodes.

In addition, "slurry" in this specification refers to a liquid mixture in which at least a part of a solid content is dispersed in a solvent, and includes a so-called slurry, paste and ink.

Hereinafter, although the present disclosure will be described in detail using a flat rectangular lithium ion secondary battery as an example, the present disclosure is not intended to be limited to those described in these embodiments.

Figure 1:
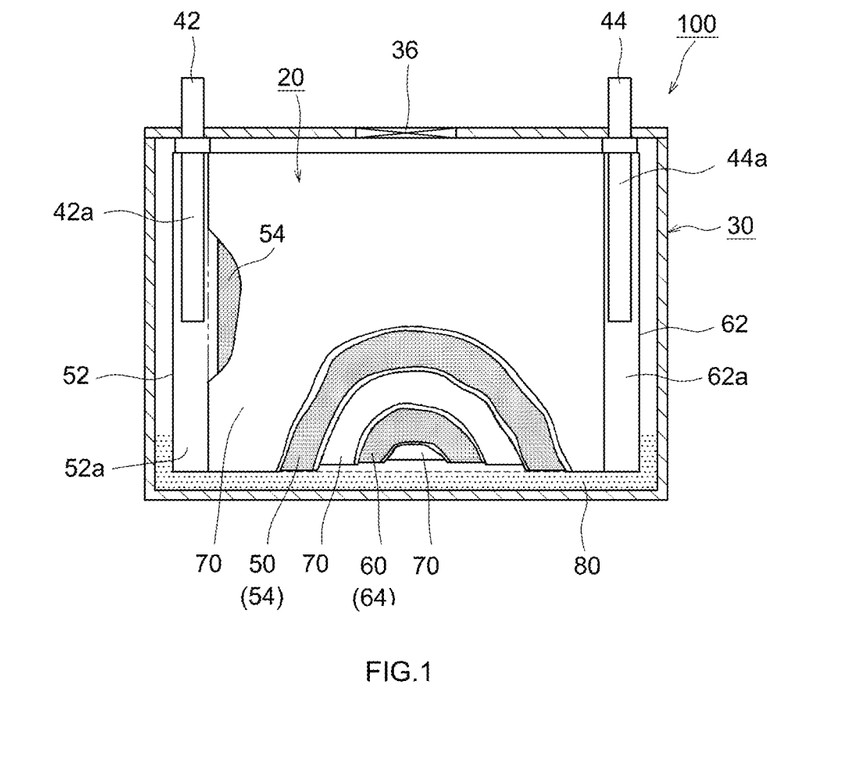
FIG. 1 is a cross-sectional view schematically showing an internal structure of a lithium ion secondary battery according to one embodiment of the present disclosure.

A lithium ion secondary battery 100 shown in FIG. 1 is a sealed battery constructed by a flat wound electrode body 20 and a non-aqueous electrolyte 80 which are accommodated in a flat rectangular battery case (that is outer container) 30. In the battery case 30, a positive electrode terminal 42 and a negative electrode terminal 44 for external connection, and a thin safety valve 36 that is set, when an internal pressure of the battery case 30 increases to a predetermined level or higher, to release the internal pressure are provided. In addition, an injection port (not shown) through which the non-aqueous electrolyte 80 is injected is provided in the battery case 30. The positive electrode terminal 42 is electrically connected to a positive electrode current collecting plate 42a. The negative electrode terminal 44 is electrically connected to a negative electrode current collecting plate 44a. Regarding the material of the battery case 30, for example, a lightweight metal material having favorable thermal conductivity such as aluminum is used.

Figure 2:
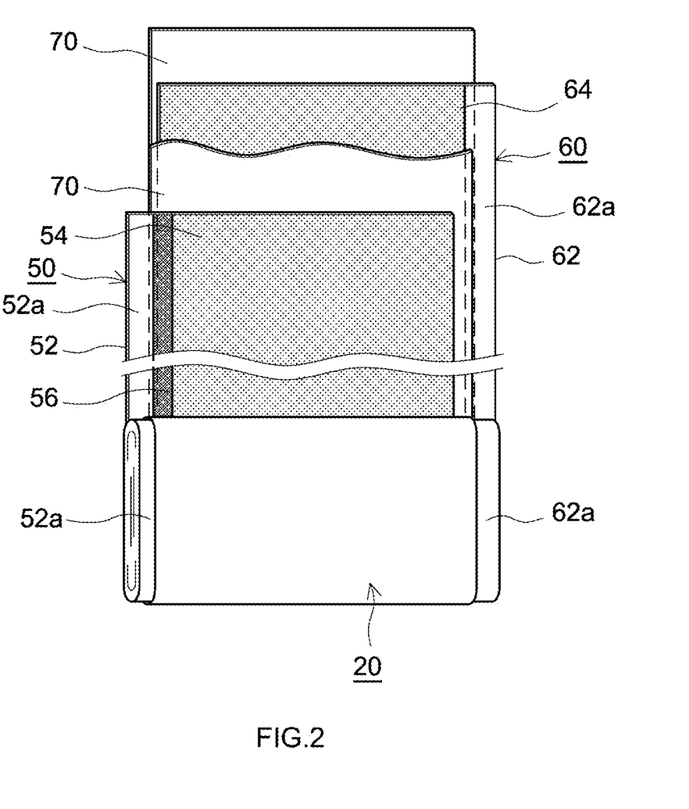
FIG. 2 is a schematic view showing a configuration of a wound electrode body of a lithium ion secondary battery according to one embodiment of the present disclosure.

As shown in FIG. 1 and FIG. 2, the wound electrode body 20 has a form in which an elongated positive electrode sheet 50, and an elongated the negative electrode sheet 60 are superimposed with two elongated separator sheets 70 therebetween and wound in a longitudinal direction.

Figure 3:
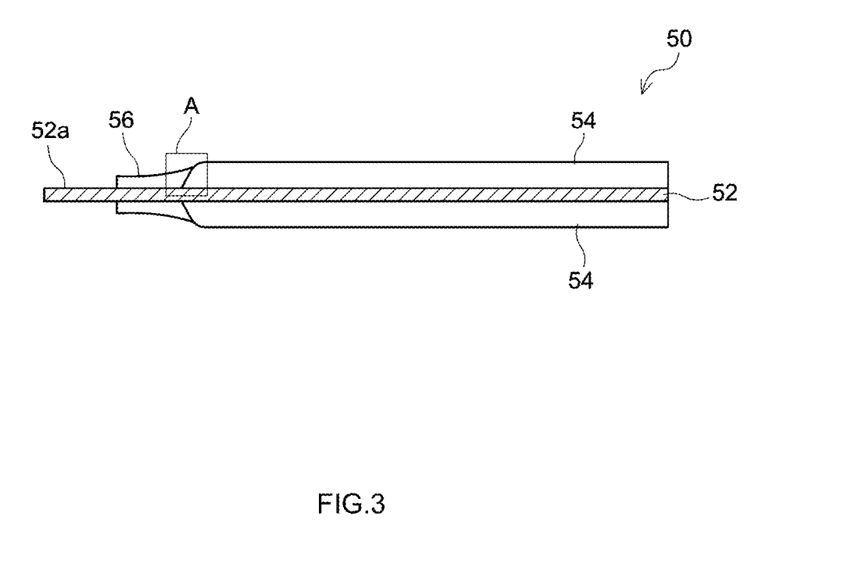
FIG. 3 is a schematic cross-sectional view of a positive electrode of a lithium ion secondary battery according to one embodiment of the present disclosure.

As shown in FIG. 2 and FIG. 3, the positive electrode sheet 50 includes an elongated positive electrode current collector 52, and a positive electrode active material layer 54 formed on the positive electrode current collector 52. In the illustrated example, the positive electrode active material layer 54 is provided on both surfaces of the positive electrode current collector 52, but may be provided on one surface. In addition, the positive electrode current collector 52 has a part (positive electrode current collector exposed part) 52a in which the positive electrode current collector 52 is exposed without forming the positive electrode active material layer 54. As shown in FIG. 2, the positive electrode current collector exposed part 52a is formed so that it protrudes outward from one end of the wound electrode body 20 in a winding axis direction (that is, a sheet width direction orthogonal to the longitudinal direction). The positive electrode current collecting plate 42a is bonded to the positive electrode current collector exposed part 52a.

In addition, the positive electrode sheet 50 has a heat resistant layer 56 formed on the positive electrode current collector 52. The heat resistant layer 56 is adjacent to the positive electrode active material layer 54, and is positioned between the positive electrode active material layer 54 and the positive electrode current collector exposed part 52a in a plane direction of the positive electrode sheet 50. In other words, the heat resistant layer 56 is positioned at the boundary between the positive electrode active material layer 54 and the positive electrode current collector exposed part 52a. In the illustrated example, the heat resistant layer 56 is provided on both surfaces of the positive electrode current collector 52, but may be provided on one surface.

Figure 4:
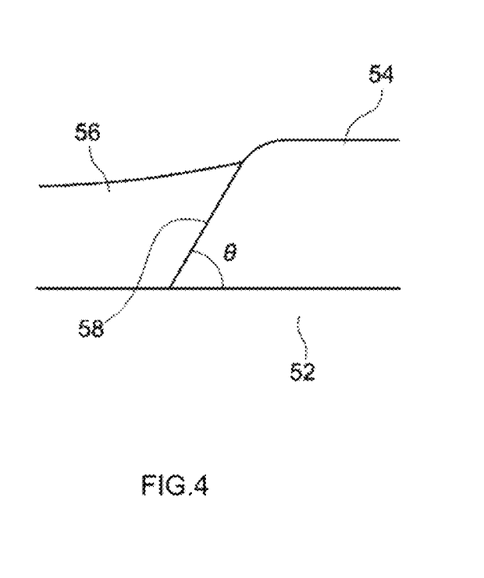
FIG. 4 is an enlarged view of the inside of a rectangular frame A in FIG. 3.

In the present embodiment, as shown in FIG. 4, the end of the positive electrode active material layer 54 is inclined. The inclination angle at the end of the positive electrode active material layer 54 can be expressed as an angle θ formed by a boundary line 58 between the positive electrode active material layer 54 and the heat resistant layer 56, and the positive electrode current collector 52 on the side of the positive electrode active material layer 54. In order to increase the capacity of the lithium ion secondary battery 100, the angle θ is desirably 45 degrees or more, more desirably 50 degrees or more, and still more desirably 55 degrees or more. In addition, the angle θ is desirably less than 90 degrees, more desirably 85 degrees or less, and still more desirably 75 degrees or less. Here, when the boundary line 58 is not a straight line, the angle θ may be obtained by straight line approximation.

Examples of the positive electrode current collector 52 constituting the positive electrode sheet 50 include an aluminum foil.

The positive electrode active material layer 54 contains a positive electrode active material.

Examples of the positive electrode active material include lithium transition metal oxides (for example, $LiNi_{1/3}Co_{1/3}Mn_{1/3}O_2$, $LiNiO_2$, $LiCoO_2$, $LiFeO_2$, $LiMn_2O_4$, and $LiNi_{0.5}Mn_{1.5}O_4$), and lithium transition metal phosphate compounds (for example, $LiFePO_4$).

In the present embodiment, the positive electrode active material is porous particles in which primary particles are aggregated. That is, the positive electrode active material has a form of secondary particles in which primary particles are aggregated, and the secondary particles have a porous structure. The porous structure means a structure having at least two or more pores in the secondary particle. In the porous structure, the pores desirably have a 3D network structure.

The average particle size of secondary particles of the positive electrode active material is not particularly limited, and is desirably 0.1 μm or more, more desirably 2 μm or more, and still more desirably 5 μm or more. Meanwhile, the average particle size of secondary particles of the positive electrode active material is desirably 20 μm or less, and more desirably 15 μm or less.

Here, "average particle size" in this specification refers to a particle size ($D_0$, also referred to as a median diameter) corresponding to a cumulative frequency of 50 volume % from the fine particle end having a small particle size in a volume-based particle size distribution based on a general laser diffraction and light scattering method.

The tap density of the positive electrode active material is not particularly limited, and is desirably 0.75 g/mL or more, more desirably 0.9 g/mL or more, and still more desirably 1.0 g/mL or more. Meanwhile, the tap density of the positive electrode active material is desirably 1.66 g/mL or less, and more desirably 1.6 g/mL or less.

Here, the tap density of the positive electrode active material can be measured according to a method defined in JIS K 1469:2003 using a general tapping type density measurement device.

The content of the positive electrode active material in the positive electrode active material layer 54 is not particularly limited, and is desirably 82 mass % or more and 98 mass % or less, and more desirably 85 mass % or more and 95 mass % or less.

The positive electrode active material layer 54 may include components other than the positive electrode active material, for example, trilithium phosphate, a conductive material, a binder, and the like. Regarding the conductive material, for example, carbon black such as acetyhlene black (AB) and other carbon materials (for example, graphite) may be suitably used. Regarding the binder, for example, polyvinylidene fluoride (PVdF) or the like may be used.

The content of trilithium phosphate in the positive electrode active material layer 54 is not particularly limited, and is desirably 1 mass % or more and 15 mass % or less, and more desirably 2 mass % or more and 12 mass % or less.

The content of the conductive material in the positive electrode active material layer 54 is not particularly limited, and is desirably 1 mass % or more and 15 mass % or less, and more desirably 3 mass % or more and 13 mass % or less.

The content of the binder in the positive electrode active material layer 54 is not particularly limited, and is desirably 1 mass % or more and 15 mass % or less, and more desirably 1.5 mass % or more and 10 mass % or less.

The heat resistant layer 56 contains an inorganic filler. Typically, the heat resistant layer 56 further contains a binder.

The shape of the inorganic filler is not particularly limited, and may be a particle shape, a fiber shape, a plate shape, a flake shape, or the like.

Regarding the inorganic filler, those having insulation and heat resistance are used. Specific examples thereof include inorganic oxides such as alumina ($Al_2O_3$), magnesia (MgO), silica ($SiO_2$), and titania ($TiO_2$), nitrides such as aluminum nitride, and silicon nitride, metal hydroxides such as calcium hydroxide, magnesium hydroxide, and aluminum hydroxide, clay minerals such as mica, talc, boehmite, zeolite, apatite, and kaolin, and glass fibers. These can be used alone or two or more thereof can be used in combination. Among these, alumina, boehmite, and magnesia are desirable.

The average particle size of the inorganic filler is not particularly limited, and is desirably 0.1 μm or more, and more desirably 0.5 μm or more. Meanwhile, the average particle size of the inorganic filler is desirably 10 μm or less, and more desirably 5 μm or less.

The tap density of the inorganic filler is not particularly limited, and is desirably 0.4 g/mL or more, and more desirably 0.57 g/mL or more. Meanwhile, the tap density of the inorganic filler is desirably 1.2 g/mL or less, and more desirably 1.0 g/mL or less.

Here, the tap density of the inorganic filler can be measured by a method defined in JIS K 1469:2003 using a general tapping type density measurement device.

Examples of binders include an acrylic binder, styrene butadiene rubber (SBR), and a polyolefin binder, and a fluoropolymer such as polyvinylidene fluoride (PVdF) and polytetrafluoroethylene (PTFE) also can be used.

The content of the binder in the heat resistant layer 56 is not particularly limited, and is, for example, 1 mass % or more and 30 mass % or less, and desirably 3 mass % or more 25 mass % or less.

Mixing of the positive electrode active material layer 54 and the heat resistant layer 56 is caused by mixing of a positive electrode slurry and a heat resistant layer slurry when the positive electrode slurry and the heat resistant layer slurry are simultaneously applied. In order to restrict such mixing, it is necessary to control a gap between positive electrode active materials in the applied positive electrode slurry and a gap between inorganic fillers in the applied heat resistant layer slurry.

The inventors have conceived use of a tap density as an index for these gaps. However, in the case of porous particles in which primary particles are aggregated, voids in the porous particles can also affect the tap density. For example, a tap density of a positive electrode active material having a small pore volume in porous particles and a large gap between porous particles may be the same as a tap density of a positive electrode active material having a large pore volume in porous particles and a small gap between porous particles. Therefore, the inventors have conceived use of a DBP oil absorption as an index for voids in porous particles.

Thus, as a result of extensive studies, the inventors have found that, as will be demonstrated in examples to be described below, when the DBP oil absorption of the positive electrode active material is within a specific range, and a ratio of a tap density of the positive electrode active material to a tap density of the inorganic filler is within a specific range, it is possible to restrict mixing at an interface between the positive electrode active material layer and the heat resistant layer when the positive electrode slurry and the heat resistant layer slurry are simultaneously applied.

Here, in the present embodiment, the DBP oil absorption of the positive electrode active material is 26.5 mL/100 g or more and 45.0 mL/100 g or less.

In addition, a ratio of the tap density of the positive electrode active material to the tap density of the inorganic filler (tap density of positive electrode active material/tap density of inorganic filler) is 1.32 or more and 2.44 or less.

The DBP oil absorption of the positive electrode active material is desirably 31.8 mL/100 g or more and 45.0 mL/100 g or less, and more desirably 31.8 mL/100 g or more and 39.4 mL/100 g or less because a positive electrode slurry having an appropriate viscosity and favorable coatability is easily prepared.

Here, the DBP oil absorption of the positive electrode active material can be measured using dibutyl phthalate (DBP) as a reagent liquid and according to a method defined in JIS K 62174:2008.

As shown in FIG. 2, the negative electrode sheet 60 includes an elongated negative electrode current collector 62, and a negative electrode active material layer 64 formed on the negative electrode current collector 62. In the illustrated example, the negative electrode active material layer 64 is provided on both surfaces of the negative electrode current collector 62, but may be provided on one surface. In addition, the negative electrode current collector 62 has a part (negative electrode current collector exposed part) 62a in which the negative electrode current collector 62 is exposed without forming the negative electrode active material layer 64. The negative electrode current collector exposed part 62a is formed so that it protrudes outward from the other end of the wound electrode body 20 in the winding axis direction (that is, a sheet width direction orthogonal to the longitudinal direction). The negative electrode current collecting plate 44a is bonded to the negative electrode current collector exposed part 62a.

Examples of the negative electrode current collector 62 constituting the negative electrode sheet 60 include a copper foil. The negative electrode active material layer 64 contains a negative electrode active material. Regarding the negative electrode active material, for example, carbon materials such as graphite, hard carbon, and soft carbon may be used. The negative electrode active material layer 64 may contain components other than the active material, for example, a binder, a thickener, and the like. Regarding the binder, for example, styrene butadiene rubber (SBR) or the like may be used. Regarding the thickener, for example, carboxymethyl cellulose (CMC) or the like may be used.

Examples of the separator 70 include a porous sheet (film) made of a resin such as polyethylene (PE), polypropylene (PP), polyester, cellulose, polyamide, or the like. Such a porous sheet may have a single-layer structure or a laminated structure in which two or more layers are laminated (for example, a three-layer structure in which a PP layer is laminated on both surfaces of a PE layer). A heat resistant layer (HRL) may be provided on the surface of the separator 70.

In the present embodiment, regarding the non-aqueous electrolyte 80, a non-aqueous electrolytic solution is used. Typically, the non-aqueous electrolyte 80 contains a non-aqueous solvent and a supporting salt.

Regarding the non-aqueous solvent, organic solvents such as various carbonates, ethers, esters, nitriles, sulfones, and lactones which are used for an electrolytic solution of a general lithium ion secondary battery can be used without particular limitation. Among these, carbonates are desirable, and specific examples thereof include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluorodimethyl carbonate (TFDMC). These non-aqueous solvents can be used alone or two or more thereof can be used in combination appropriately.

Regarding the supporting salt, for example, lithium salts such as $LiPF_6$, $LiBF_4$, and $LiClO_4$ (desirably $LiPF_6$) can be suitably used. The concentration of the supporting salt is desirably 0.7 mol/L or more and 1.3 mol/L or less.

Here, the non-aqueous electrolyte 80 may contain various additives, for example, a gas generating agent such as biphenyl (BP) and cyclohexylbenzene (CHB); a film forming agent such as an oxalato complex compounds containing boron atoms and/or phosphorus atoms, and vinylene carbonate (VC); a dispersant; a thickener, and the like as long as the effects of the present disclosure are not significantly impaired.

The lithium ion secondary battery 100 configured as described above can be produced while mixing at an interface between the positive electrode active material layer and the heat resistant layer is restricted even if a positive electrode slurry and a heat resistant layer slurry are simultaneously applied. In the lithium ion secondary battery 100 produced while mixing of a positive electrode active material layer and a heat resistant layer is restricted even if simultaneous coating is carried out, the decrease in the capacity due to the tapered part at the end of the positive electrode active material layer and the like are restricted, and additionally, peeling off the heat resistant layer due to stress caused by expansion and contraction of the positive electrode active material layer when a non-aqueous electrolyte secondary battery is charged and discharged is restricted.

A method of producing the lithium ion secondary battery 100 is not particularly limited. A suitable production method includes a step in which a positive electrode slurry containing a positive electrode active material and a heat resistant layer slurry containing an inorganic filler are simultaneously applied to the positive electrode current collector 52 so that the positive electrode slurry and the heat resistant layer slurry are adjacent to each other (simultaneous coating step), a step of obtaining a positive electrode by drying the applied positive electrode slurry and heat resistant layer slurry (positive electrode producing step), and a step of assembling the lithium ion secondary battery 100 using the positive electrode (battery assembling step). In the production method, the positive electrode active material is porous particles in which primary particles are aggregated. In addition, the dibutyl phthalate oil absorption of the positive electrode active material is 26.5 mL/100 g or more and 45.0 mL/100 g or less. In addition, a ratio of a tap density of the positive electrode active material to a tap density of the inorganic filler is 1.32 or more and 2.44 or less.

The positive electrode slurry contains components constituting the positive electrode active material layer 54 and a solvent. The heat resistant layer slurry contains components constituting the heat resistant layer 56 and a solvent. The positive electrode slurry and the heat resistant layer slurry can be prepared according to known methods, and concentrations of these solid contents each are desirably 45 mass % or more, and more desirably 50 mass % or more and 80 mass % or less. The viscosities of the positive electrode slurry and the heat resistant layer slurry each are desirably more than 2,000 mPa·s and less than 15,000 mPa·s.

In the simultaneous coating step, it is desirable to use a die coater. When the die coater is used, it is possible to simultaneously and easily apply these slurries from the same die head so that the positive electrode slurry and the heat resistant layer slurry are adjacent to each other.

The other operations of the simultaneous coating step and other steps can be performed according to a known method.

The lithium ion secondary battery 100 can be used for various applications. Examples of suitable applications include driving power supplies mounted in vehicles such as electric vehicles (EV), hybrid vehicles (HV), and plug-in hybrid vehicles (PHV). The lithium ion secondary battery 100 can also be used in the form of a battery pack in which a plurality of cells are typically connected in series and/or in parallel.

Here, as an example, the rectangular lithium ion secondary battery 100 including the flat wound electrode body 20 will be described. However, the lithium ion secondary battery can be configured as a lithium ion secondary battery including a stacked-type electrode body. In addition, the lithium ion secondary battery can be configured as a cylindrical lithium ion secondary battery, a laminated-type lithium ion secondary battery, or the like. In addition, the technology disclosed here can be applied to non-aqueous electrolyte secondary batteries other than lithium ion secondary batteries.

While examples related to the present disclosure will be described below, the present disclosure is not intended to be limited to those shown in the examples.

Production of Lithium Ion Secondary Battery

Acetylene black (AB) as a conductive material, polyvinylidene fluoride (PVdF) and N-methyl-2-pyrrolidone (NMP) were mixed using a dispersing machine to obtain a slurry. A mixed powder of $LiNi_{1/3}Co_{1/3}Mn_{1/3}O_2$ (LNCM) as a positive electrode active material and $Li_3PO_4$ was put into the slurry, and the solid matters were then uniformly dispersed therein to prepare a positive electrode slurry. It should be noted that, the positive electrode slurry was prepared so that LNCM:Li$_3$PO$_4$:AB:PVdF=87:3:8:2 (mass ratio). In this case, for LNCM, those having a DBP oil absorption and a tap density shown in Table 1 were used.

Boehmite as an inorganic filler, PVdF as a binder, and NMP were mixed using a dispersing machine to prepare a heat resistant layer slurry. In this case, for boehmite, those having a tap density shown in Table 1 were used.

The positive electrode slurry and the heat resistant layer slurry were simultaneously applied onto both surfaces of an elongated aluminum foil in a belt form from the same die head using a die coater, and then dried to produce a positive electrode sheet. The application was performed so that the heat resistant layer slurry was adjacent to the positive electrode slurry.

In this manner, the positive electrode sheet having a form shown in FIG. 3 was produced.

Natural graphite (C) as a negative electrode active material, styrene butadiene rubber (SBR) as a binder, and carboxymethyl cellulose (CMC) as a thickener were mixed with deionized water at a mass ratio of C:SBR:CMC=98:1:1 to prepare a negative electrode slurry. The negative electrode slurry was applied onto both surfaces of an elongated copper foil in a belt form and dried and then pressed to produce a negative electrode sheet.

A porous polyolefin sheet having a three-layer structure of PP/PE/PP was prepared as a separator.

The produced positive electrode sheet and negative electrode sheet, and the two prepared separator sheets were laminated, wound, and then pressed from a lateral direction into a flat shape to produce a flat wound electrode body.

Next, a positive electrode terminal and a negative electrode terminal were connected to the wound electrode body, and are accommodated in a rectangular battery case having an electrolytic solution injection port.

Subsequently, a non-aqueous electrolyte was injected from the injection port of the battery case, and the injection port was hermitically sealed. It should be noted that regarding the non-aqueous electrolyte, an electrolyte in which LiPF$_6$ as a supporting salt was dissolved at a concentration of 1.1 mol/L in a mixed solvent containing ethylene carbonate (EC), ethyl methyl carbonate (EMC), and dimethyl carbonate (DMC) at a volume ratio of EC:EMC:DMC=3:4:3 was used.

In this manner, lithium ion secondary batteries of examples and comparative examples were produced.

Evaluation of Mixing of Positive Electrode Active Material Layer and Heat Resistant Layer Cross-sectional images of the produced positive electrodes were obtained using an electronic probe micro analyzer (EPMA), and element mapping was performed on the images. Based on the results of element mapping, it was determined whether the positive electrode active material layer and the heat resistant layer were mixed or not. The results are shown in Table 1.

Evaluation of Slurry Viscosity

The viscosity of the produced positive electrode slurry was measured using a B type viscometer under conditions of a rotational speed of 20 rpm. The results are shown in Table 1.

TABLE 1

|  | DBP oil absorption of positive electrode active material (mL/100 g) | Tap density | | Tap density ratio positive electrode active material/inorganic filler | Slurry viscosity (mPa · s) | Mixing at interface | |
|---|---|---|---|---|---|---|---|
|  |  | Positive electrode active material (g/mL) | Inorganic filler (g/mL) |  |  | Positive electrode active material layer side | Heat resistant layer side |
| Example 1 | 31.8 | 1.1 | 0.68 | 1.62 | 7005 | No | No |
| Example 2 | 35.7 | 1.56 | 0.68 | 2.29 | 7977 | No | No |
| Example 3 | 39.4 | 1.37 | 0.68 | 2.01 | 9477 | No | No |
| Example 4 | 39.4 | 1.37 | 0.78 | 1.76 | 9004 | No | No |
| Example 5 | 45 | 0.81 | 0.57 | 1.42 | 12927 | No | No |
| Example 6 | 35.7 | 1.56 | 1 | 1.56 | 8975 | No | No |
| Example 7 | 40.1 | 0.75 | 0.57 | 1.32 | 11282 | No | No |
| Example 8 | 26.5 | 1.66 | 0.68 | 2.44 | 1770 | No | No |
| Comparative Example 1 | 40.1 | 0.75 | 0.68 | 1.10 | 5545 | Yes | No |
| Comparative Example 2 | 47 | 0.73 | 0.68 | 1.07 | 15657 | Yes | No |
| Comparative Example 3 | 40.1 | 0.75 | 1 | 0.75 | 8824 | Yes | No |
| Comparative Example 4 | 30.3 | 0.7 | 0.68 | 1.03 | 6730 | Yes | No |
| Comparative Example 5 | 22.2 | 2.01 | 0.68 | 2.96 | 1620 | No | Yes |
| Comparative Example 6 | 29.1 | 1.88 | 0.68 | 2.76 | 3630 | No | Yes |
| Comparative Example 7 | 31.9 | 1.67 | 0.68 | 2.46 | 5939 | No | Yes |
| Comparative Example 8 | 37.5 | 1.95 | 0.68 | 2.87 | 11203 | No | Yes |
| Comparative Example 9 | 35.7 | 1.56 | 0.57 | 2.74 | 10485 | No | Yes |

Based on the results of Table 1, it can be understood that, when the positive electrode active material was porous particles in which primary-particles were aggregated, the dibutyl phthalate oil absorption of the positive electrode active material was 26.5 mL/100 g or more and 45.0 mL/100 g or less, and a ratio of the tap density of the positive electrode active material to the tap density of the inorganic filler was 1.32 or more and 2.44 or less, mixing at an interface between the positive electrode active material layer and the heat resistant layer was restricted.

Based on the above results, it can be understood that, according to the non-aqueous electrolyte secondary battery disclosed here, it is possible to provide a non-aqueous electrolyte secondary battery that can be produced while mixing at an interface between the positive electrode active material layer and the heat resistant layer is restricted, even if a positive electrode slurry and a heat resistant layer slurry are simultaneously applied.

While specific examples of the present disclosure have been described above in detail, these are only examples, and do not limit the scope of claims. The technology described in the claims includes various modifications and alternations of the above exemplified specific examples.

What is claimed is:

1. A non-aqueous electrolyte secondary battery, comprising:
    a positive electrode;
    a negative electrode; and
    a non-aqueous electrolyte, wherein
    the positive electrode includes a positive electrode current collector, a positive electrode active material layer formed on the positive electrode current collector, and a heat resistant layer which is formed on the positive electrode current collector and is adjacent to the positive electrode active material layer;
    the positive electrode active material layer contains a positive electrode active material,
    the positive electrode active material is porous particles in which primary particles are aggregated,
    the positive electrode active material has a dibutyl phthalate oil absorption of 26.5 mL/100 g or more and 45.0 mL/100 g or less,
    the heat resistant layer contains an inorganic filler, and
    a ratio of a tap density of the positive electrode active material to a tap density of the inorganic filler is 1.32 or more and 2.44 or less.

2. The non-aqueous electrolyte secondary battery according to claim 1,
    wherein the positive electrode active material has the dibutyl phthalate oil absorption of 31.8 mL/100 g or more and 45.0 mL/100 g or less.

* * * * *